US006792420B2

(12) United States Patent
Stephen Chen et al.

(10) Patent No.: US 6,792,420 B2
(45) Date of Patent: Sep. 14, 2004

(54) METHOD, SYSTEM, AND PROGRAM FOR OPTIMIZING THE PROCESSING OF QUERIES INVOLVING SET OPERATORS

(75) Inventors: Yao Ching Stephen Chen, Saratoga, CA (US); Yumi Kimura Tsuji, San Jose, CA (US); Yun Wang, Saratoga, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 09/896,453

(22) Filed: Jun. 29, 2001

(65) Prior Publication Data

US 2003/0055814 A1 Mar. 20, 2003

(51) Int. Cl.[7] .............................. G06F 17/30; G06F 7/00
(52) U.S. Cl. .......................................................... 707/3
(58) Field of Search ............................................ 707/3

(56) References Cited

U.S. PATENT DOCUMENTS

| | | | | |
|---|---|---|---|---|
| 5,956,707 A | * | 9/1999 | Chu ............................... | 707/3 |
| 6,205,451 B1 | * | 3/2001 | Norcott et al. ............... | 707/204 |
| 6,289,334 B1 | * | 9/2001 | Reiner et al. .................. | 707/3 |
| 6,327,587 B1 | * | 12/2001 | Forster ........................... | 707/2 |

OTHER PUBLICATIONS

Lars et al., "Incremental computation of Nested relational query expressions", ACM transaction on database systems, vol. 20, No. 2, Jun. 1995, pp. 111–148.*
Lars et al., "Incremental computation of Nested relational query expressions", ACM transaction on database systems, vol. 20, No. 2, Jun. 1995, pp. 111–148.*

Hellerstein, Joseph M., *Predicate Migration: Optimizing Queries with Expensive Predicates,* Dec. 3, 1992, Computer Science Division, EECS Department, University of California, Berkeley, CA 94720.
Pirahesh, Hamid, et al., *Extensible/Rule Based Query Rewrite Optimization in Starburst,* © 1992, IBM Almaden Research Center, San Jose, CA 94720.
Mishra, Prite, et al., *Join Processing in Relational Databases,* ACM Computing Surveys, vol. 24, No. 1, Mar. 1992.
Weihrauch, Maryela, "DB2 for OS/390: Version 5 Versus Version 6 Outer Join Performance". *The IDUG Solutions Journal,* vol. 7, No. 3, Winter 2000. [Retrieved on Jun. 10, 2001]. Retrieved from the Internet at <URL: http://www.idug.org/member/journal/winter00/article108.cfm>.
International Business Machines Corporaton, IBM DB2 Universal Database, SQL Getting Started, Version 7, 1993, 2000.
Yevich, Richard. "Technical Talk Outer Joins: No More Worries". *The IDUG Solutions Journal: Technical Talk,* vol. 6, No. 3 Fall 1999. [Retrieved on Jun. 10, 2001]. Retrieved from the Internet at <URL:http://www.idug.org/member/journal/nov99/technical.cfm>.

* cited by examiner

*Primary Examiner*—Wayne Amsbury
*Assistant Examiner*—Cindy Nguyen
(74) *Attorney, Agent, or Firm*—Konrad Raynes & Victor LLP; David W. Victor

(57) ABSTRACT

Provided is a method, system, and program for processing a query including a query operation on a table derived from a set operation on two result tables. The query operation is performed on each result table separately to produce two intermediate result tables. The set operator is then applied to the two intermediate result tables to produce a final result table that is a same result table that would have been produced by performing the query operation on the table derived from the set operation performed on the two result tables.

49 Claims, 5 Drawing Sheets

METHOD, SYSTEM, AND PROGRAM FOR OPTIMIZING THE PROCESSING OF QUERIES INVOLVING SET OPERATORS

BACKGROUND OF THE INVENTION

1. Field of the Invention

The present invention relates to a method, system, and program for processing queries involving set operations.

2. Description of the Related Art

Data records in a relational database management system (RDBMS) in a computer are maintained in tables, which are a collection of rows all having the same columns. Each column maintains information on a particular type of data for the data records which comprise the rows. One or more indexes may be associated with each table. An index is an ordered set of pointers to data records in the table based on the data in one or more columns of the table. In some cases, all the information needed by a query may be found in the index, making it unnecessary to search the actual table. An index is comprised of rows or index entries which include an index key and a pointer to a database record in the table having the key column values of the index entry key. An index key is comprised of key columns that provide an ordering to records in a table. The index key columns are comprised of the columns of the table, and may include any of the values that are possible for that particular column. Columns that are used frequently to access a table may be used as key columns. Using an index to search and access rows in the associated table substantially improves query performance.

Database tables may be accessed using the Structured Query Language (SQL), which comprises a recognized language to query, access and manipulate data in a database. The SQL language includes set operators UNION, UNION ALL, INTERSECT, INTERSECT ALL, EXCEPT, and EXCEPT ALL. The UNION operator produces a result table that has all rows from two input tables, which are the result of query operations of some base tables (each may contain more than one), the INTERSECT operator produces a result table that has all rows in common between two input tables, and the EXCEPT operator produces a result table having all rows that are in a first table, but not a second table. The input tables to set operators are generally result tables that result from either subselects or fullselects that contain set operators. The ALL suffix used with these set operators, e.g., UNION ALL, includes all duplicate rows from the result table, whereas using the set operator without the ALL suffix, e.g., UNION, removes duplicate rows from the result table.

Complex database queries may use the set operators UNION, INTERSECT, and EXCEPT in combination with other query operations, such as a JOIN. A join query forms all combinations of rows from two or more tables according to a join condition, such that the combined rows must satisfy the predicates of the join condition. One performance disadvantage with performing subsequent query operations, such as join operations, on tables derived from the set operators is that the table derived from the set operator is materialized on a hard disk drive ("disk") before the query operation can be performed thereon. For instance, for a UNION operation, the rows of the two combined input tables are materialized in a work file on disk. Subsequent query operations would then have to read the rows from the work file materialized, i.e., written, on disk. Disk Input/ Output (I/O) operations have significant overhead and adversely affect query performance because of the time required to write the result table from memory to disk, and then read back the rows of the result table from disk to use in the subsequent query operations. Moreover, performance with respect to the subsequent query operations is further degraded as the size of the materialized result table increases, because a larger materialized result table requires more disk I/O operations.

Materializing a result table derived from the set operators also harms performance because there is no index available when applying the query operation to the materialized result table. Indexes can substantially improve query performance, especially join query performance. Although an index could be generated for the materialized result table for use in the subsequent query operations, the time required to generate such an index would adversely affect performance. Moreover, generating a new index for the materialized result table does not avoid the need for the disk I/O operations, which, as discussed above, adversely affect the performance of subsequent query operations using the materialized result table.

For all these reasons, there is a need in the art to develop improved query optimization techniques to handle query operations applied to result tables derived from set operators.

SUMMARY OF THE PREFERRED EMBODIMENTS

Provided is a method, system, and program for processing a query including a query operation on a table derived from a set operation on two input tables. The query operation is performed on each input table separately to produce two intermediate result tables. The set operator is then applied to the two intermediate result tables to produce a final result table that is a same result table that would have been produced by performing the query operation on the table derived from the set operation performed on the two input tables.

In further implementation, the final result table is generated without having to materialize in a storage device any intermediate result tables.

Still further, the input tables may comprise base tables having indexes, and wherein the indexes on the two base tables may be used to perform the query operation on each input table separately.

In certain implementation, the set operation comprises one of a UNION ALL, EXCEPT ALL or INTERSECT ALL operation. In such case, if the query operation comprises a WHERE clause including predicates to apply to the table derived from the set operation on the two input tables, then the WHERE clause is applied to each of the input tables separately. Further, if the query operation comprises a JOIN of a table to the table derived from the set operation on the two input tables, then the JOIN of the table is applied to each of the input tables separately to produce the two intermediate result tables.

In implementations where the query operation comprises a column function and the set operation comprises a UNION ALL, then the column function is applied to each of the input tables separately to produce at least one value for each input table subject to the set operation. The at least one value for each of the input tables is aggregated to produce at least one aggregate value that would have been produced by applying the column function to the UNION ALL of the two input tables.

The described implementations provide techniques to optimize query processing when query operations are performed on tables derived from set operators.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
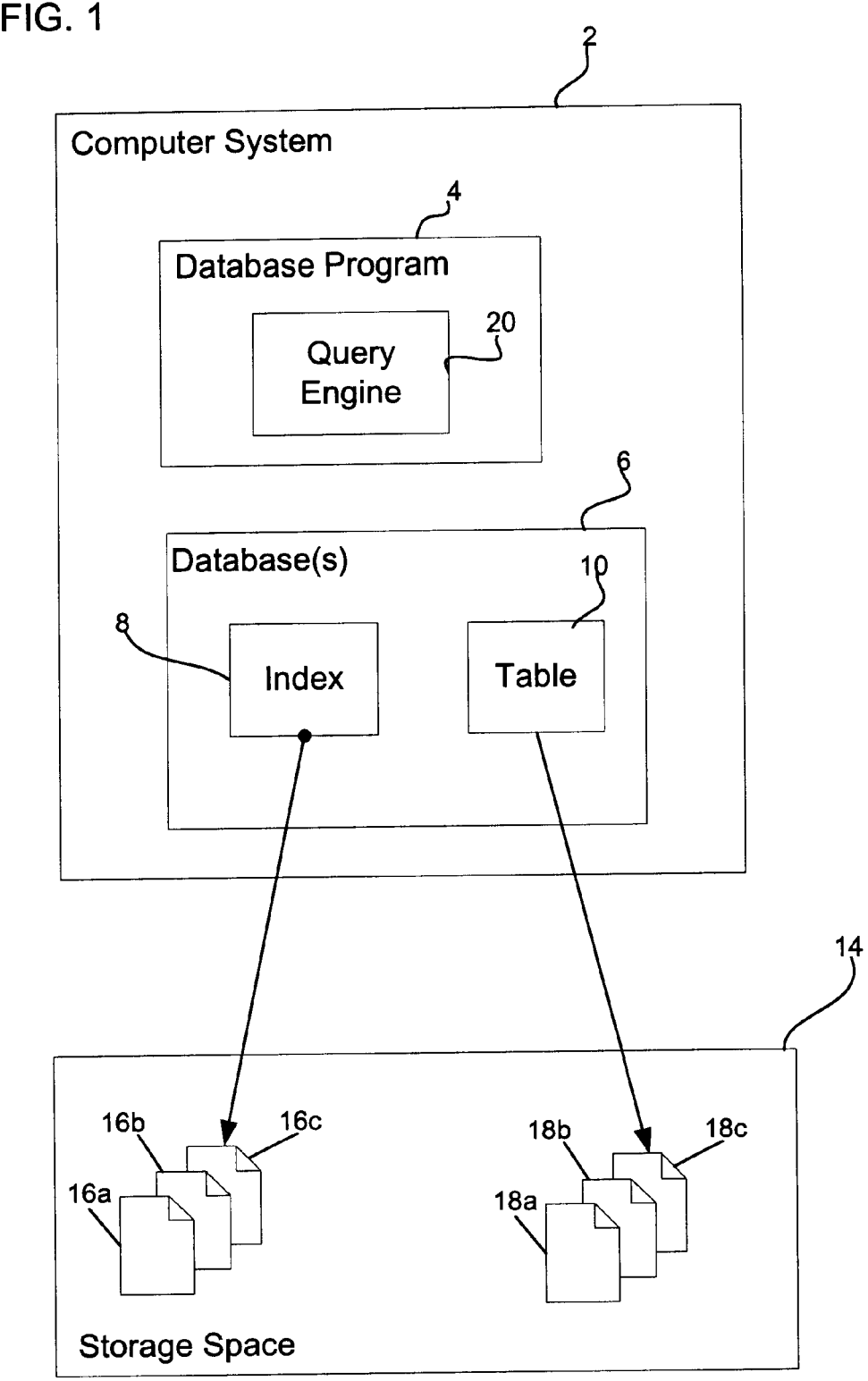
FIG. 1 illustrates a computing environment in which the invention is implemented.

FIG. 1 illustrates a computing environment in which a database may be implemented. A computer system 2, which may be a computer including an operating system such as MICROSOFT WINDOWS 98 and WINDOWS NT, AIX, OS/390, OS/2, MVS, etc., includes a database program 4, such as DB2, MICROSOFT SQL SERVER, Oracle Corporation's ORACLE 8, etc. The database program 4 is used to access database information maintained in one or more databases 6. The database(s) 6 may consist of one or more indexes 8 and one or more tables 10. The indexes 8 provide an ordered set of pointers to data in the table 10 based on the data in one or more columns of the table. Further details of the structure and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

**Microsoft, Windows, Windows NT, and SQL Server are registered trademarks of Microsoft Corporation; DB2, AIX, OS/390, and OS/2 are registered trademarks of IBM, MVS is a trademark of IBM; and Oracle8 is a trademark of Oracle Corporation.

A storage space 14 stores the actual data sets that include the data for the indexes and tables. The storage space 14 includes the pages 16a, b, c which contain the index entries for the index 8, such as the leaf pages when the index 8 is comprised of a B-tree. The storage space 14 further includes pages 18a, b, c of the records in the table 10. The storage space 14 may comprise a non-volatile storage space, such as a direct access storage device (DASD), which is comprised of numerous interconnected hard disk drives. Alternatively the storage space 14 may comprise storage pools within non-volatile memory, or a combination of non-volatile and volatile memories. The storage space 14 also stores tables materialized, such as tables that must be sorted or tables resulting from the set operators, e.g., UNION, INTERSECT, EXCEPT, etc.

The database program 4 includes a query engine 20 that is capable of executing SQL operations, such as the SQL operations described in the publication entitled "SQL Reference, Version 7", IBM Document no. SC09-2975-00 (IBM Copyright, 2000). The described implementations provide algorithms implemented in the query engine 20 techniques to optimize queries involving the UNION, INTERSECT, EXCEPT, UNION ALL, INTERSECT ALL, and EXCEPT ALL set operators.

For the UNION ALL, INTERSECT ALL, EXCEPT ALL algebraic operations, the query engine 20 would apply the following rules:

Predicate Distribution Rule: Whenever predicates (WHERE clause) are applied to the union of two result tables or subselects, then the predicates are applied separately to each of the tables or subselects before the UNION ALL operation is performed. For example for SELECT (P) (TI UNION ALL T2), where P is a predicate, the rule transforms the query into SELECT (P)(T1) UNION ALL SELECT (P) (T2). T1 and T2 are subselects of base tables. T1 and T2 are also referred to herein as input tables, as they are derived from subselects or subqueries on base tables. This rule is applicable to all six set operators.

Join Distribution Rule: Whenever one table is joined with the result table of a UNION ALL of two input tables, i.e., subselects of base tables, the join is distributed into the input tables and subselects of the base tables before the set operator is executed, where the join predicate between T1 and the result table of T2 UNION ALL T3 is transformed to the join predicates between T1 and T2 and between T1 and T3, respectively. For example, T1 JOIN (T2 UNION ALL T3) becomes (T1 JOIN T2) UNION ALL (T1 JOIN T3). This rule is likewise applicable to the INTERSECT ALL and EXCEPT ALL operators. An Extended Join distribution rule using the row identifier (RID) is applicable to the other three non-ALL set operators as described with respect to FIG. 6 below.

Projection Distribution Rule: The projection (SELECT clause in SQL queries) applied to the result table of a UNION ALL operator can be performed on each subselect of the UNION ALL before applying the UNION ALL operator. The UNION ALL of the result tables from applying projection to the subselects of the UNION ALL produces the same result as applying projection to the result table of UNION ALL of the subselects. The Projection distribution rule only applies to the UNION ALL operator.

The Predicate Distribution Rule allows early evaluation of the predicates with any indexes to further reduce the number of rows subject to the set operators before the final result table is materialized on the storage space 14. The Join Distribution Rule further allows the indexes for the base tables to be used in performing the JOIN operation to reduce the number of rows in the result tables subject to the set operation, e.g., UNION ALL, INTERSECT ALL, EXCEPT ALL, and written to the storage space 14. To accomplish this result, the query operations, e.g., WHERE clause, JOIN, PROJECT, that are applied to the set operation, e.g., UNION ALL, on the subselect of base tables, are distributed to the subselect. This distribution allows the query to be merged with the subselect query, and then this merged query combining the query and subselect are applied to the base tables.

Figure 2:
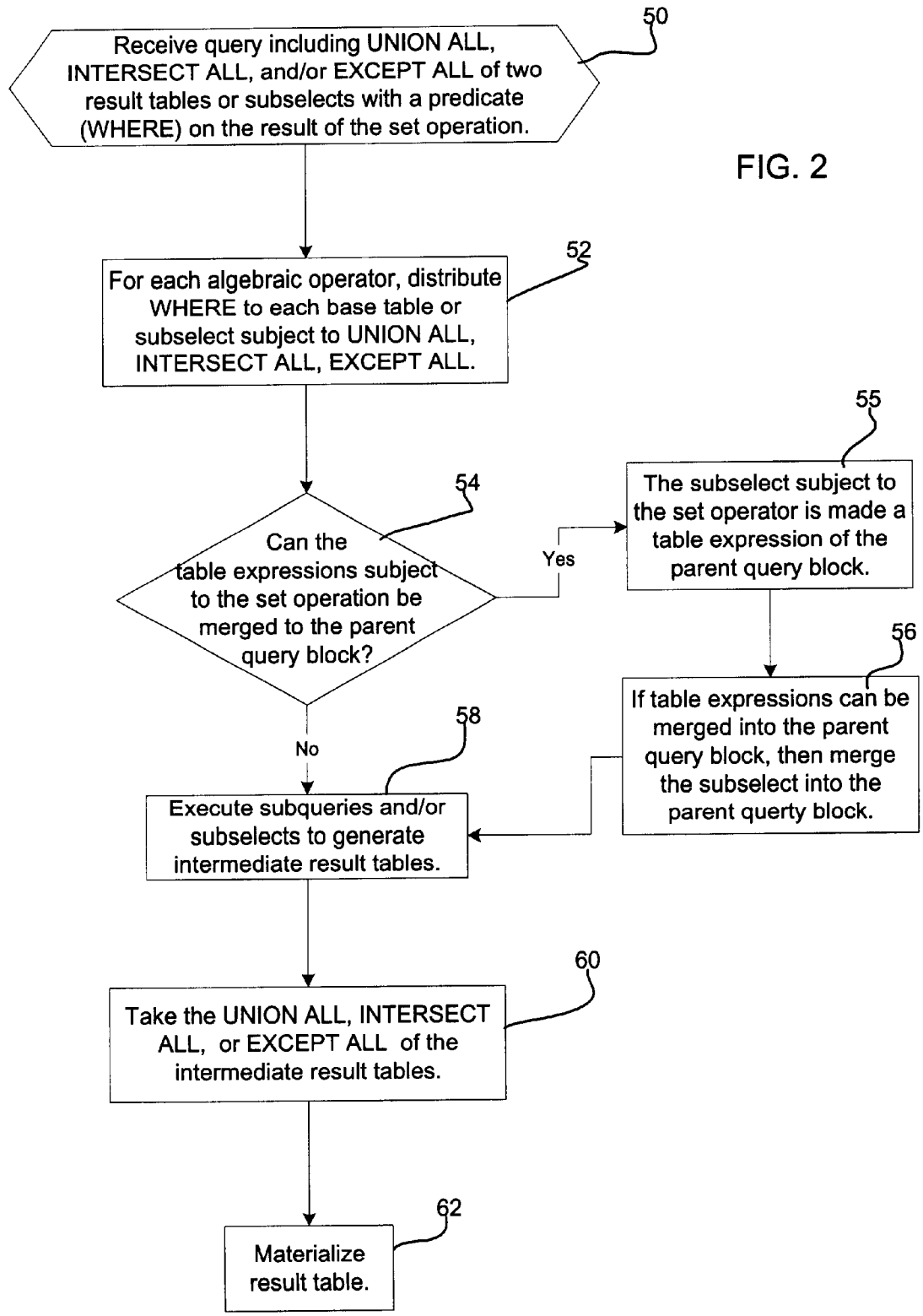
FIG. 2 illustrates logic to optimize a query operation on a table derived from a set operator.
Figure 3A:
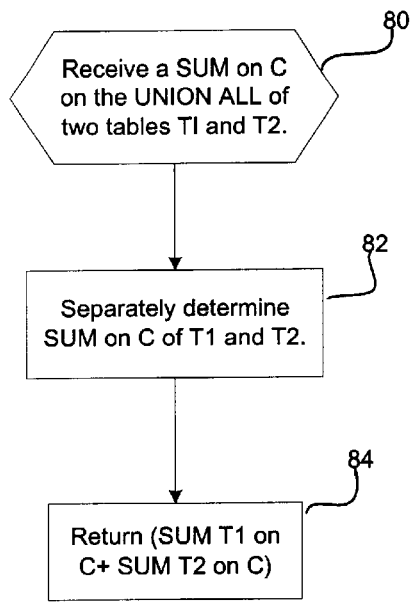
FIGS. 3a, 3b, 4a, 4b, 5, 6 illustrate logic to optimize query operations applied to a result table derived from a set operator.

FIGS. 2, 3a,b, 4a, b, 5, and 6 provide logic to distribute WHERE predicates, aggregations, JOINS and SELECT clauses (projection) to the subselects of the set operators. If the query applied to the set operator on two input tables, e.g., subselects of base tables, comprises multiple query operations, e.g., a combination of a WHERE, JOIN, PROJECT, etc., then all such query operations would be distributed in one step to the sub selects of the base tables that are subject to the set operation. The subselect query may then be merged with the distributed parent query operations. This merged query may then be applied to the base tables, thereby allowing the use of any indexes available for the base tables.

FIG. 2 illustrates logic implemented in the query engine 20 to utilize the predicate distribution rule upon receiving, at block 50, a query involving the UNION ALL, INTERSECT ALL, and EXCEPT ALL of two tables or subselects followed by a WHERE statement providing a predicate for the result of the set operation. In response, the query engine 20 distributes (at block 52) the WHERE clause to each input table or subselect of a base table subject to the set operator. If (at block 54) the table expressions subject to the set operation can be merged to a parent query block, then after distribution of the WHERE clause, the subselect subject to the set operator becomes (at block 55) table expressions of the parent query block. If (at block 56) the table expressions can be merged into the parent query block, then the query engine 20 merges the subselect into the parent query block. The subselect queries each merged with the parent query block are then separately executed (at block 58) to produce two intermediate result tables, which are then subject to the set operation (at block 60) to produce a final result table that is materialized (at block 62). If (at block 54) the expressions subject to the set operator are not the subselect of a parent query block, then the subqueries and/or subselects are executed (at block 60) to produce intermediate result tables subject to the set operation (at block 62).

With the above described logic of FIG. 2, the query engine 20 does not have to materialize any intermediate tables resulting from an algebraic ALL operator upon which further WHERE operations are performed that require I/O writes to access the data and then reads to retrieve the materialized rows to subject to the WHERE clause. Instead, with the described logic, only after the WHERE predicate operation is distributed and executed to produce intermediate tables in memory is the set operator applied to produce a final result table which is then materialized into the storage space 14. Further, the WHERE clause is distributed to the subselect of the base tables subject to the set operator and merged with the subselect. This merged query may then be applied to the base tables before the set operator, e.g., UNION ALL, is applied. The same principle for distribution of the WHERE clause described with respect to FIG. 2 would also apply to the distribution of other query types, such as JOINs, column functions, PROJECTs, etc.

The logic implemented in the query engine 20 for the Join Distribution Rule would be substantially the same as the logic of FIG. 2 for the Predicate Distribution Rule except that instead of distributing a WHERE predicate clause, the join operation would be distributed to each table or subselect subject to the set operator. Still further, if the tables and/or subselects subject to the set operator were subject to WHERE operators or JOINs following the set operation, then both the WHERE predicates, which may include JOINs, would be distributed to the base tables or subselects subject to the set operation. The distributed WHEREs and JOINs on the tables or subselects would then be executed to produce two intermediate result tables which would then be subject to the set operation, e.g., UNION ALL, INTERSECT ALL, EXCEPT ALL. The JOIN operation may be performed with respect to more than two tables.

Below is an example of a query involving the UNION ALL of two subselects.

```
SELECT    T1.C1, T2.C2, X.C3
FROM      T1, (SELECT T3.C5, T4.T6
              FROM T3, T4
              WHERE T3.A1 = T4.A1
```

-continued

```
                AND T3.A2 = 'ABC'
          UNION ALL
          SELECT T5.C7, T6.C8
          FROM T5, T6
          WHERE T5.B1 = T6.B1
                AND T6.B2 = 'XYZ') X(C3, C4), T2
WHERE     T1.D1 = X.C4 AND T1.D2 = T2.D2
          AND T2.D3 LIKE '123%'
```

The logic of FIG. 2 would then distribute the WHERE, JOIN, and PROJECT clauses of the parent block to the two subselects of the UNION ALL to produce the following intermediate queries of two subselects with the distributed WHERE clause.

```
SELECT    T1.C1, T2.C2, X.C3
FROM      T1, (SELECT T3.C5, T4.T6
              FROM T3, T4
              WHERE T3.A1 = T4.A1
                    AND T3.A2 = 'ABC') X(C3, C4), T2
WHERE     T1.D1 = X.C4 AND T1.D2 = T2.D2
          AND T2.D3 LIKE '123%'
SELECT    T1.C1, T2.C2, X.C3
FROM      T1, (SELECT T5.C7, T6.C8
              FROM T5, T6
              WHERE T5.B1=T6.B1
                    AND T6.B2='XYZ') X(C3, C4), T2
WHERE     T1.D1=X.C4 AND T1.D2=T2.D2
          AND T2.D3 LIKE '123%'
```

The logic of FIG. 2 would then merge the two subselects with the parent query block at step 56 in FIG. 2 followed by the application of the set operation on the resulting subselects to produce the following query block, thereby allowing the merged query to be executed against the base tables.

```
SELECT         T1.C1, T2.C2, T3.C5
FROM           T1, T3, T4, T2
WHERE          T1.D1 = T4.C6 AND T1.D2 = T2.D2
               AND T2.D3 LIKE '123%' AND T3.A1 = T4.A1
               AND T3.A2 = 'ABC'
UNION ALL
SELECT         T1.C1, T2.C2, T5.C7
FROM           T1, T5, T6, T2
WHERE          T1.D1 = T6.C8 AND T1.D2 = T2.D2
               AND T2.D3 LIKE '123%' AND T5.B1 = T6.B1
               AND T6.B2 = 'XYZ'
```

Further implementations provide the "Aggregate Distribution Rule" to optimize column functions on two base tables subject to a UNION ALL operation. The "Aggregate Distribution Rule" concerns queries including a column function performed on the UNION ALL of two base tables. For aggregation (column functions with group-by) applied to the result of a UNION ALL operator, a set of new column functions is provided to apply the specified column functions with the group-by (new aggregation) to each input table of the UNION ALL. UNION ALL is then applied to the intermediate results from applying the new aggregation to the input tables of the UNION ALL. A final aggregation (re-aggregation) is applied to the result of the UNION ALL of the aggregation result of the input tables to produce the final result. The Aggregate Distribution Rule only applies to the UNION ALL operator.

For instance, under the Aggregate Distribution Rule, the column functions, e.g., AVG, MIN, MAX, STDDEV, are applied to each of the subselects of the base tables subject to the set operator before the set operation is performed to produce intermediate results of the column function applied to each of the base tables. For certain of the operations, intermediate values may be maintained to allow for completion of the column function on the UNION ALL. For cases without aggregate distribution, these intermediate results are then combined to produce the result of the UNION ALL without ever actually performing a UNION ALL operation that would require materialization of the result table in the storage space 14. For cases without aggregate distribution, the materialization is avoided or deferred for joins until column functions are evaluated, which may require materialization. In this way, the column function on a UNION ALL of input tables, e.g., subselects of base tables, is performed by distributing the column function to the subselects of the base tables for handling and then aggregate the resulting value(s) to produce a result value without having to materialize any intermediate tables and then performing the column function on the materialized work file in the storage space 14 including the UNION ALL of the two base tables. For column functions that involve division, if the divisor is zero, a NULL value is returned.

FIG. 3a illustrates logic implemented by the query engine 20 to perform a SUM operation on column C of the UNION ALL of input tables T1 and T2, which are subselects of base tables, beginning at block 80. The query engine 20 distributes the sums to separately sum (at block 82) the values in column C of tables T1 and T2 and then return (at block 84) the sum of these two intermediate sums of T1 and T2 on column C.

Figure 3B:
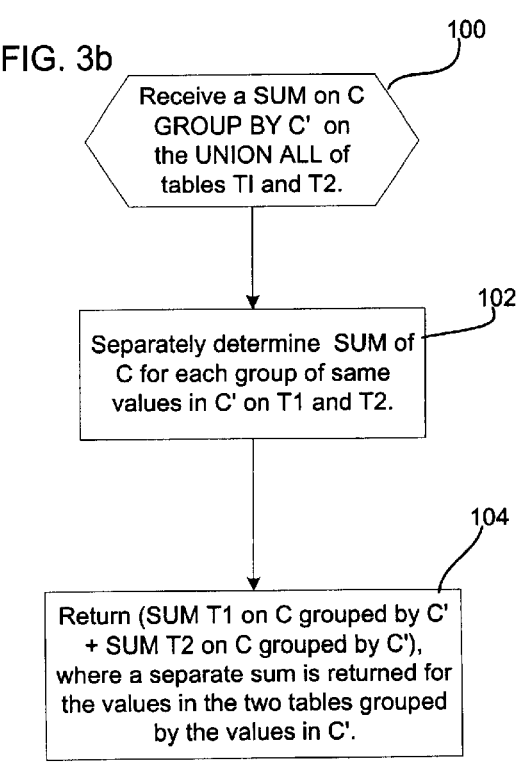

FIG. 3b illustrates logic implemented by the query engine 20 to perform a SUM operation on column C grouped by column C prime of the UNION ALL of two input tables T1 and T2, beginning at block 100. The query engine 20 separately determines (at block 102) the sum of the values in column C grouped according to the values in column C prime. The summed values for each group according to column C prime in tables T1 and T2 are then added together (at block 104) to return the total of the values in column C in tables T1 and T2 grouped by the values in column C prime.

Figure 4A:
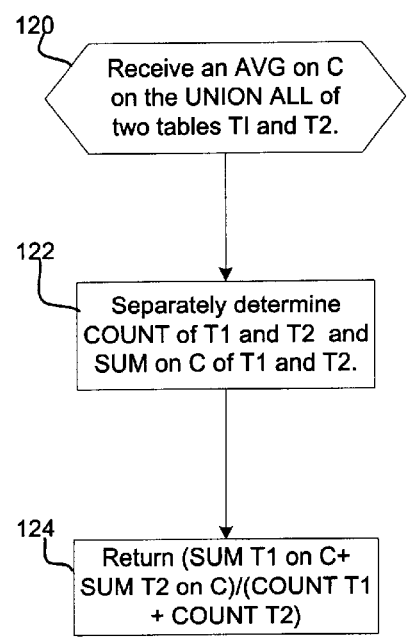

FIG. 4a illustrates logic implemented by the query engine 20 to perform an average (AVG) operation on column C of the UNION ALL of tables T1 and T2, beginning at block 120. The query engine 20 separately determines (at block 122) the COUNTs of T1 and T2 and SUMs on column C of T1 and T2. The query engine 20 then adds (at block 124) the SUMs of T1 and T2 on column C together and divides by the sum of the COUNTs of T1 and T2.

Figure 4B:
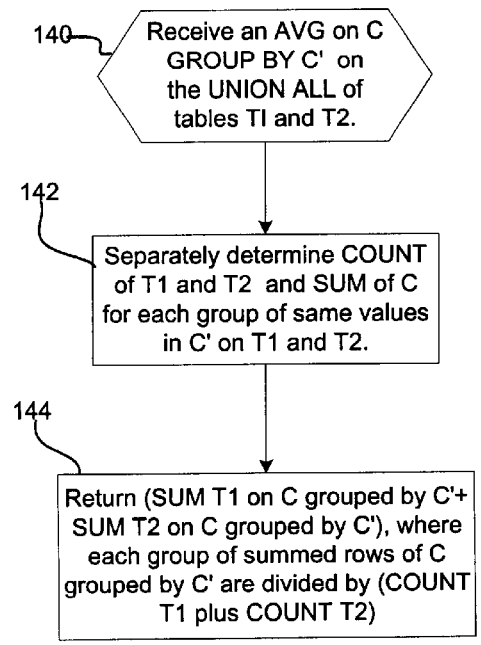

FIG. 4b illustrates logic implemented in the query engine 20 to perform the average operation on column C of two tables subject to a UNION ALL operation that is grouped by column C prime.

Figure 5:
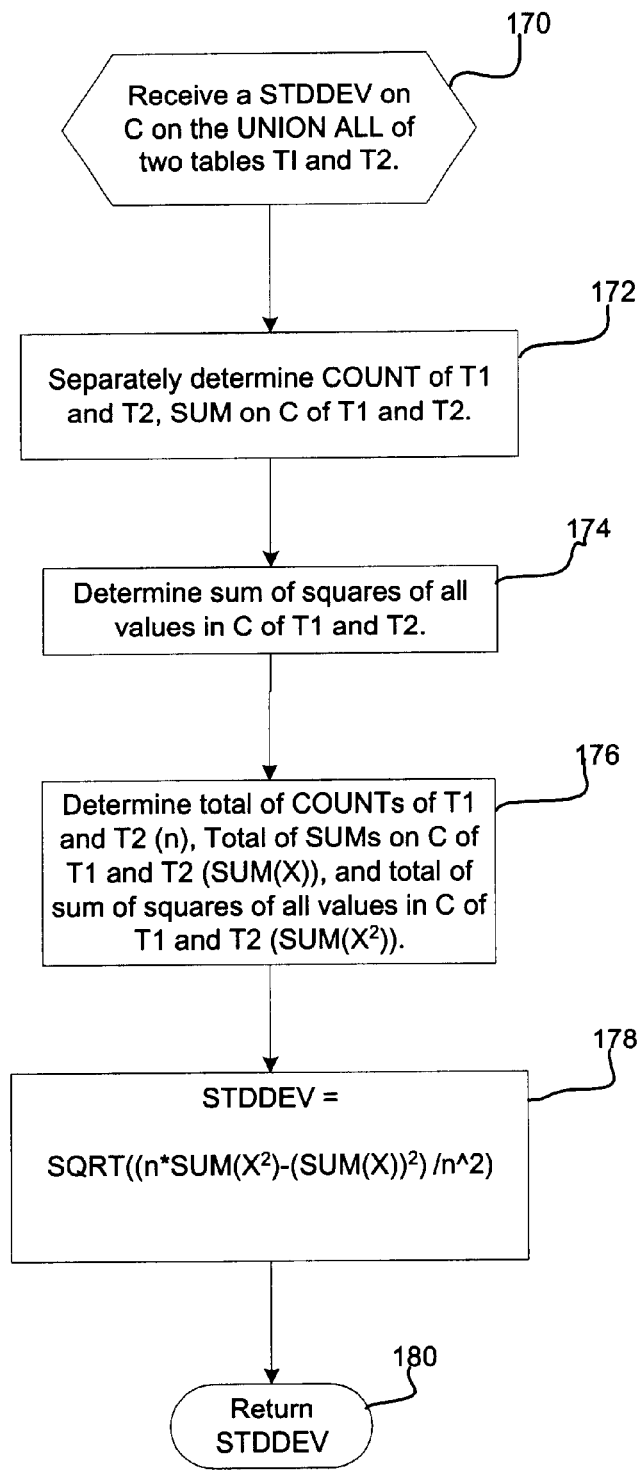

FIG. 5 illustrates logic implemented by the query engine 20 to optimize a standard deviation (STDDEV) operation on column C of the UNION ALL of tables T1 and T2, beginning at block 170. The query engine 20 separately determines (at block 172) the COUNT of T1 and T2 and the SUM of the values of column C in T1 and T2. The query engine 20 further separately determines (at block 174) the sum of the squares of all the values in column C of tables T1 and T2. The values determined for each table separately and for the COUNT, SUM, and sum of squares are then added (at block 176) together to determine a total COUNT (N), SUM(X), and sum of squares SUM($X^2$) for the values in both tables, where X indicates the values in column C of tables T1 and T2. The standard deviation is then calculated (at block 178) from these added values as follows:

$$\sqrt{\frac{N*SUM(X^2) - (SUM(X))^2}{N^2}}$$

With the above described logic, the column function is distributed to the subselect of the base tables subject to the UNION ALL operation and performed on the separate parts and then aggregated to produce the same result as if the column function was applied to the UNION ALL of the two base tables. With the described implementations, the result is produced without having to perform disk I/Os to materialize a work file of the UNION ALL of the two input tables and then read out rows from the work file on disk to perform the column function thereon. By avoiding any disk I/Os the described Aggregate Distribution Rule substantially improves the performance of a column function performed on the UNION ALL of two tables. Further implementations provide techniques to improve performance for processing the UNION, INTERSECT, and EXCEPT algebraic operators, which remove duplicate rows from the base table. In providing a WHERE clause that applies to the result of a UNION, INTERSECT, and EXCEPT on two tables or subselects, the Predicate Distribution Rule would apply, as discussed above, to distribute the WHERE clause separately to the tables or subselects and perform the additional operation of eliminating rows after the set operation is performed and before the result table materialized in the work file.

Figure 6:
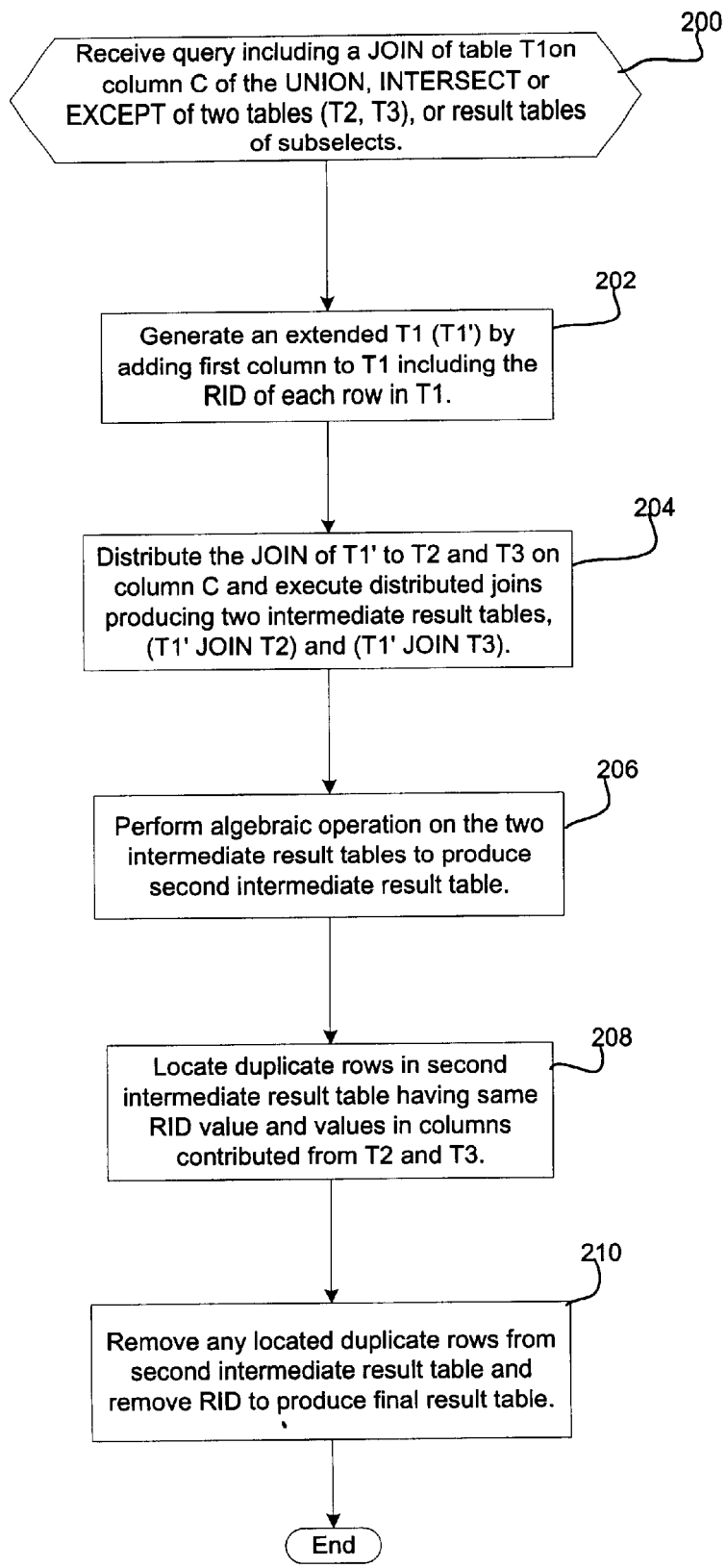

To apply the Join Distribution Rule to the UNION, INTERSECT, and EXCEPT operations, in certain implementations, the query engine 20 will first distribute the JOIN to each of the tables or subselects subject to the UNION, INTERSECT, and EXCEPT set operator and then perform an operation to remove the duplicate rows. The JOIN operation, and logic described herein, may be applied to join more than two tables. FIG. 6 illustrates logic implemented in the query engine 20 to perform the Join Distribution Rule for algebraic operations such as UNION, INTERSECT, and EXCEPT. Control begins at block 200 upon receiving a query including a JOIN of table T1 on column C of the UNION, INTERSECT or EXCEPT of two tables (T2, T3), or result tables derived from subselects. In response, the query engine 20 generates (at block 202) an extended table T1 (referred to as T1') that adds a column to T1 including the unique row identifier (RID) of each row in table T1. The JOIN of T1 on column C is then distributed (at block 204) to the two base tables subject to the set operator to produce two intermediate tables (T1' JOIN T2) and (T1' JOIN T3), both joined on column C. The query engine 20 then performs (at block 206) the set operation, e.g., UNION ALL, INTERSECT ALL or EXCEPT ALL, on the two intermediate result tables to produce a second intermediate result table that may include duplicate rows. All duplicate rows having the same RID value and the same values in the columns contributed from the tables T2 and T3 subject to the set operator are removed (208 and 210) to produce a final result table having no duplicate rows. This final result table with the RID removed may then be materialized in the storage space 14.

Thus, the described implementations provide a technique for allowing WHERE and JOIN query operations to be performed on two tables or subselects subject to a set operator, such as UNION, INTERSECT, EXCEPT, UNION ALL, INTERSECT ALL, and EXCEPT ALL without having to materialize the result table until the WHERE or JOIN operation is performed. Further, the described implementations provide a technique for applying various column functions to tables subject to a UNION ALL operation without having to materialize the result of the UNION ALL operation before the column functions are applied. These techniques thus allow various predicate, JOIN, and column functions to be applied to tables subject to set operators in a manner that minimizes the number of disk I/Os needed Additional Implementation Details In preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Preferred embodiments were described with respect to a query engine that performs the steps of optimizing the query to provide improvements to the database management systems (DBMS) program.

The described implementations discussed six different set operators to subject to the optimization techniques described herein. The described implementations may apply to other set operators that exhibit the properties of the set operators described herein.

The described implementations may apply to subselects and nested subselects to continually push down, i.e., distribute, the query operations, e.g., WHERE clauses and JOINs, before applying the set operator.

Those skilled in the art will appreciate that the searching algorithm of the preferred embodiments may apply to search operations performed with respect to any type of data structures comprised of columns or rows or a list of records that have values for common fields of information. The preferred embodiment search techniques are not limited to tables or other database structures, such as tables, indexes or other permutations of ordered data that must be considered.

The algorithm of the preferred embodiments was described as having particular steps in a particular order. However, alternative algorithms in accordance with the invention may include modifications, deletions, and/or additions to the steps described in the preferred embodiment algorithms. Such modified algorithms would still produce more efficient searches on missing columns than current methods for searching missing columns in multi-column indexes.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a query including query operations and a set operation on two input tables, comprising:

applying two or more distribution rules at one time to transform the query, wherein the distribution rules correspond to the query operations;

performing the query operations on each input table separately to produce two intermediate result tables, wherein the query operations exploit available indexes; and applying the set operator on the two intermediate result tables to produce a final result table that is a same result table that would have been produced by performing the query operations on a result table derived from the set operation performed on the two input tables.

2. The method of claim 1, wherein the final result table is generated without having to materialize in a storage device any intermediate result tables.

3. The method of claim 1, wherein each input table results from a subselect query on at least one base table, wherein performing the query operations on each input table to produce the two intermediate result tables comprises:

merging the query operations with each subselect query;

performing each merged query operation on the at least one base table subject to the subselect to produce the two intermediate result tables.

4. The method of claim 3, wherein indexes are available for the base tables subject to the subselect queries, further comprising:

using the indexes when performing each merged query operation on the at least one base table.

5. The method of claim 1, wherein the set operation comprises one of a UNION ALL, EXCEPT ALL or INTERSECT ALL operation.

6. The method of claim 5, wherein at least one of the query operations comprises a WHERE clause including predicates, and wherein the WHERE clause is applied to each of the input tables separately to generate the two intermediate result tables.

7. The method of claim 5, wherein at least one of the query operations comprises a WHERE clause including predicates to apply to the table derived from the set operation on the two input tables, wherein two subselect queries are provided to generate the two intermediate result tables to which the set operation is applied, further comprising:

distributing the WHERE clause to each of the subselect queries to generate intermediate subselect queries, wherein the WHERE clause is distributed to each subselect to generate the intermediate result tables to which the set operation is applied.

8. The method of claim 4, wherein the at least one of the query operations comprises a WHERE clause including predicates to apply to the table derived from the set operation on the two input tables and wherein the WHERE clause is part of a parent query block, wherein two subselect queries are provided to generate the two intermediate result tables to which the set operation is applied, further comprising:

distributing the WHERE clause to each of the subselect queries to generate first intermediate subselect queries;

merging the parent query block with each of the first intermediate subselect queries to generate second intermediate subselect queries; and executing the second intermediate subselect queries against the input tables to produce the intermediate result tables to which the set operation is applied.

9. The method of claim 1, wherein at least one of the query operations comprises a column function and the set operation comprises a UNION ALL, wherein performing the query operations comprises:

performing the column function on each of the input tables separately to produce at least one value for each input table subject to the set operation; and aggregating the at least one value for each of the input tables to produce at least one aggregate value that is a same as the at least one value that would have been produced by applying the column function to the UNION ALL of the input tables.

10. The method of claim 9, wherein the column function comprises an AVERAGE function on one column, and wherein performing the column function on each of the input tables comprises:

determining a sum of all the values in the column in each of the input tables to produce two intermediate sum values for the two input tables;

determining a number of rows in each of the input tables to produce two intermediate count values; and dividing a total of the two intermediate sum values by a total of the two intermediate count numbers to produce the AVERAGE on the column of the UNION ALL of the two input tables.

11. A method for processing a query including a query operation on a table derived from a set operation on two input tables, comprising:

performing the query operation on each input table separately to produce two intermediate result tables, wherein the query operation comprises a column function and a set operation comprises a UNION ALL, and wherein performing the query operation comprises:

(i) performing the column function on each of the input tables separately to produce at least one value for each input table subject to the set operation, wherein the column function comprises a STANDARD DEVIATION function on one column, and wherein performing the column function on each of the input tables comprises:

(a) determining a sum of all the values in the column in each of the input tables to produce two intermediate sum values for the two input tables;

(b) determining a number of rows in each of the input tables to produce two count values;

(c) determining a sum of all the values squared in the column in each of the input tables to produce two intermediate sum of squared values for the two intermediate result tables;

(d) setting a total of the two count values to n;

(e) setting a total of the two intermediate sum values to $\Sigma x$ ;

(f) setting a total of the two intermediate sums of the squared values to $\Sigma x^2$; and (g) calculating the standard deviation on the column of the UNION ALL of the two input tables as:

$$\sqrt{\frac{n*\Sigma x^2 - (\Sigma x)^2}{n^2}} \; ;$$

(ii) aggregating the at least one value for each of the input tables to produce at least one aggregate value that is a same as the at least one value that would have been produced by applying the column function to the UNION ALL of the input tables; and applying the set operator on the two intermediate result tables to produce a final result table that is a same result table that would have been produced by performing the query operation on a result table derived from the set operation performed on the two input tables.

12. The method of claim 4, wherein at least one of the query operations comprises a JOIN of a table to the table derived from the set operation on the two input tables, and wherein the JOIN of the table is applied to each of the input tables separately to produce the two intermediate result tables.

13. The method of claim 4, wherein at least one of the query operations comprises a JOIN of a table to the table derived from the set operation on the two input tables, wherein two subselect queries are provided to generate the two intermediate result tables to which the set operation is applied, further comprising:

distributing the JOIN of the table to each of the subselect queries to generate intermediate subselect queries, wherein the distributed JOIN is performed on each subselect to generate the intermediate result tables to which the set operation is applied.

14. The method of claim 13, wherein the set operation comprises one of a UNION, INTERSECT, and EXCEPT, wherein an intermediate final result table comprises the tables derived from the set operation on the intermediate result tables, further comprising:

determining duplicate rows in the intermediate final result table; and removing the duplicate rows from the intermediate final result table to generate the final result table.

15. A method for processing a query including a query operation on a table derived from a set operation on two input tables, comprising:

performing the query operation on each input table separately to produce two intermediate result tables, wherein each input table results from a subselect query on at least one base table, and wherein performing the query operation on each input table to produce the two intermediate result tables comprises:

(i) merging the query operation with each subselect query; and (ii) performing each merged query operation on the at least one base table subject to the subselect to produce the two intermediate result tables, wherein indexes are available for the base tables subject to the subselect queries, and wherein the indexes are used when performing each merged query operation on the at least one base table;

applying the set operator on the two intermediate result tables to produce a final result table that is a same result table that would have been produced by performing the query operation on a result table derived from the set operation performed on the two input tables;

wherein the query operation comprises a JOIN of a table to the table derived from the set operation on the two input tables, wherein two subselect queries are provided to generate the two intermediate result tables to which the set operation is applied, further comprising:
(i) distributing the JOIN of the table to each of the subselect queries to generate intermediate subselect queries, wherein the distributed JOIN is performed on each subselect to generate the intermediate result tables to which the set operation is applied, wherein distributing the join of the table comprises:
 (a) generating an extended join table including one column having row identifiers for each row in the table to join, wherein the extended join table is applied in the JOIN operation to each of the intermediate result tables separately, wherein the determined duplicate rows have the same value for the row identifier column and the same values for the columns from the result tables included in the intermediate final result; and
wherein the set operation comprises one of a UNION, INTERSECT, and EXCEPT, wherein an intermediate final result table comprises the tables derived from the set operation on the intermediate result tables, further comprising:
(i) determining duplicate rows in the intermediate final result table; and
(ii) removing the duplicate rows from the intermediate final result table to generate the final result table.

16. The method of claim 14, wherein the duplicate rows are removed before the final result table is materialized in a storage device.

17. A system for processing a database query including query operations and a set operation on two input tables, comprising:
a computer readable medium including input tables;
means for applying two or more distribution rules at one time to transform the query, wherein the distribution rules correspond to the query operations;
means for performing the query operations on each input table separately to produce two intermediate result tables in the computer readable medium, wherein the query operations exploit available indexes; and
means for applying the set operator on the two intermediate result tables to produce a final result table in the computer readable medium that is a same result table that would have been produced by performing the query operations on a result table derived from the set operation performed on the two input tables.

18. The system of claim 17, further comprising:
a storage device, wherein the final result table is generated in the computer readable medium without having to materialize in the storage device any intermediate result tables.

19. The system of claim 17, further comprising:
a storage device including at least one base table, wherein each input table results from a subselect query on at least one base table, wherein the means for performing the query operations on each input table to produce the two intermediate result tables further performs:
merging the query operations with each subselect query;
performing each merged query operation on the at least one base table subject to the subselect to produce the two intermediate result tables.

20. The system of claim 19, wherein the computer readable medium further includes indexes available for the base tables subject to the subselect queries, further comprising:
means for using the indexes when performing each merged query operation on the at least one base table.

21. The system of claim 17, wherein the set operation comprises one of a UNION ALL, EXCEPT ALL or INTERSECT ALL operation.

22. The system of claim 21, wherein at least one of the query operations comprises a WHERE clause including predicates, and wherein the WHERE clause is applied to each of the input tables separately to generate the two intermediate result tables.

23. The system of claim 21, wherein at least one of the query operations comprises a WHERE clause including predicates to apply to the table derived from the set operation on the two input tables, wherein two subselect queries are provided to generate the two intermediate result tables to which the set operation is applied, further comprising:
means for distributing the WHERE clause to each of the subselect queries to generate intermediate subselect queries, wherein the WHERE clause is distributed to each subselect to generate the intermediate result tables to which the set operation is applied.

24. The system of claim 20, wherein at least one of the query operations comprises a WHERE clause including predicates to apply to the table derived from the set operation on the two input tables and wherein the WHERE clause is part of a parent query block, wherein two subselect queries are provided to generate the two intermediate result tables to which the set operation is applied, further comprising:
means for distributing the WHERE clause to each of the subselect queries to generate first intermediate subselect queries;
means for merging the parent query block with each of the first intermediate subselect queries to generate second intermediate subselect queries; and
means for executing the second intermediate subselect queries against the input tables to produce the intermediate result tables to which the set operation is applied.

25. The system of claim 17, wherein at least one of the query operations comprises a column function and the set operation comprises a UNION ALL, wherein the means for performing the query operations performs:
performing the column function on each of the input tables separately to produce at least one value for each input table subject to the set operation; and
aggregating the at least one value for each of the input tables to produce at least one aggregate value that is a same as the at least one value that would have been produced by applying the column function to the UNION ALL of the input tables.

26. The system of claim 25, wherein the column function comprises an AVERAGE function on one column, and wherein the means for performing the column function on each of the input tables further performs:
determining a sum of all the values in the column in each of the input tables to produce two intermediate sum values for the two input tables;
determining a number of rows in each of the input tables to produce two intermediate count values; and
dividing a total of the two intermediate sum values by a total of the two intermediate count numbers to produce the AVERAGE on the column of the UNION ALL of the two input tables.

27. A system for processing a database query including a query operation on a table derived from a set operation on two input tables, comprising:

a computer readable medium including input tables;

means for performing the query operation on each input table separately to produce two intermediate result tables in the computer readable medium, wherein the query operation comprises a column function and the set operation comprises a UNION ALL, wherein the means for performing the query operation performs:

(i) performing the column function on each of the input tables separately to produce at least one value for each input table subject to the set operation, wherein the column function comprises a STANDARD DEVIATION function on one column, and wherein the means for performing the column function on each of the input tables performs:

(a) determining a sum of all the values in the column in each of the input tables to produce two intermediate sum values for the two input tables;

(b) determining a number of rows in each of the input tables to produce two count values;

(c) determining a sum of all the values squared in the column in each of the input tables to produce two intermediate sum of squared values for the two intermediate result tables;

(d) setting a total of the two count values to n;

(e) setting a total of the two intermediate sum values to $\Sigma x$; and (f) setting a total of the two intermediate sums of the squared values to $\Sigma x^2$; calculating the standard deviation on the column of the UNION ALL of the two input tables as:

$$\sqrt{\frac{n*\Sigma x^2 - (\Sigma x)^2}{n^2}};$$

and (ii) aggregating the at least one value for each of the input tables to produce at least one aggregate value that is a same as the at least one value that would have been produced by applying the column function to the UNION ALL of the input tables; and means for applying the set operator on the two intermediate result tables to produce a final result table in the computer readable medium that is a same result table that would have been produced by performing the query operation on a result table derived from the set operation performed on the two input tables.

28. The system of claim 20, wherein at least one of the query operations comprises a JOIN of a table to the table derived from the set operation on the two input tables, and wherein the JOIN of the table is applied to each of the input tables separately to produce the two intermediate result tables.

29. The system of claim 20, wherein at least one of the query operations comprises a JOIN of a table to the table derived from the set operation on the two input tables, wherein two subselect queries are provided to generate the two intermediate result tables to which the set operation is applied, further comprising:

means for distributing the JOIN of the table to each of the subselect queries to generate intermediate subselect queries, wherein the distributed JOIN is performed on each subselect to generate the intermediate result tables to which the set operation is applied.

30. The system of claim 29, wherein the set operation comprises one of a UNION, INTERSECT, and EXCEPT, and wherein an intermediate final result table comprises the tables derived from the set operation on the intermediate result tables, further comprising:

means for determining duplicate rows in the intermediate final result table; and means for removing the duplicate rows from the intermediate final result table to generate the final result table.

31. A system for processing a database query including a query operation on a table derived from a set operation on two input tables, comprising:

a computer readable medium including input tables;

means for performing the query operation on each input table separately to produce two intermediate result tables in the computer readable medium, a storage device including at least one base table, wherein each input table results from a subselect query on at least one base table, wherein the means for performing the query operation on each input table to produce the two intermediate result tables further performs:

(i) merging the query operation with each subselect query;

(ii) performing each merged query operation on the at least one base table subject to the subselect to produce the two intermediate result tables, wherein the computer readable medium further includes indexes available for the base tables subject to the subselect queries, and wherein the indexes are used when performing each merged query operation on the at least one base table;

means for applying the set operator on the two intermediate result tables to produce a final result table in the computer readable medium that is a same result table that would have been produced by performing the query operation on a result table derived from the set operation performed on the two input tables;

wherein the query operation comprises a JOIN of a table to the table derived from the set operation on the two input tables, wherein two subselect queries are provided to generate the two intermediate result tables to which the set operation is applied, further comprising:

(i) means for distributing the JOIN of the table to each of the subselect queries to generate intermediate subselect queries, wherein the distributed JOIN is performed on each subselect to generate the intermediate result tables to which the set operation is applied, wherein the means for distributing the join of the table performs:

(a) generating an extended join table including one column having row identifiers for each row in the table to join, wherein the extended join table is applied in the JOIN operation to each of the intermediate result tables separately, wherein the determined duplicate rows have the same value for the row identifier column and the same values for the columns from the result tables included in the intermediate final result; and wherein the set operation comprises one of a UNION, INTERSECT, and EXCEPT, and wherein an intermediate final result table comprises the tables derived from the set operation on the intermediate result tables, further comprising:

(i) means for determining duplicate rows in the intermediate final result table; and (ii) means for removing the duplicate rows from the intermediate final result table to generate the final result table.

32. The system of claim 30, wherein the duplicate rows are removed before the final result table is materialized in a storage device.

33. An article of manufacture including code for processing a query including a query operations and a set operation on two input tables by:
applying two or more distribution rules at one time to transform the query, wherein the distribution rules correspond to the query operations;
performing the query operations on each input table separately to produce two intermediate result tables, wherein the query operations exploit available indexes; and
applying the set operator on the two intermediate result tables to produce a final result table that is a same result table that would have been produced by performing the query operations on a result table derived from the set operation performed on the two input tables.

34. The article of manufacture of claim 33, wherein the final result table is generated without having to materialize in a storage device any intermediate result tables.

35. The article of manufacture of claim 33, wherein each input table results from a subselect query on at least one base table, wherein performing the query operations on each input table to produce the two intermediate result tables comprises:
merging the query operations with each subselect query;
performing each merged query operation on the at least one base table subject to the subselect to produce the two intermediate result tables.

36. The article of manufacture of claim 35, wherein indexes are available for the base tables subject to the subselect queries, further comprising:
using the indexes when performing each merged query operation on the at least one base table.

37. The article of manufacture of claim 33, wherein the set operation comprises one of a UNION ALL, EXCEPT ALL or INTERSECT ALL operation.

38. The article of manufacture of claim 37, wherein at least one of the query operations comprises a WHERE clause including predicates, and wherein the WHERE clause is applied to each of the input tables separately to generate the two intermediate result tables.

39. The article of manufacture of clam 37, wherein at least one of the query operations comprises a WHERE clause including predicates to apply to the table derived from the set operation on the two input tables, wherein two subselect queries are provided to generate the two intermediate result tables to which the set operation is applied, further comprising:
distributing the WHERE clause to each of the subselect queries to generate intermediate subselect queries, wherein the WHERE clause is distributed to each subselect to generate the intermediate result tables to which the set operation is applied.

40. The article of manufacture of claim 36, wherein at least one of the query operations comprises a WHERE clause including predicates to apply to the table derived from the set operation on the two input tables and wherein the WHERE clause is part of a parent query block, wherein two subselect queries are provided to generate the two intermediate result tables to which the set operation is applied, further comprising:
distributing the WHERE clause to each of the subselect queries to generate first intermediate subselect queries;
merging the parent query block with each of the first intermediate subselect queries to generate second intermediate subselect queries; and
executing the second intermediate subselect queries against the input tables to produce the intermediate result tables to which the set operation is applied.

41. The article of manufacture of claim 33, wherein at least one of the query operations comprises a column function and the set operation comprises a UNION ALL, wherein performing the query operations comprises:
performing the column function on each of the input tables separately to produce at least one value for each input table subject to the set operation; and
aggregating the at least one value for each of the input tables to produce at least one aggregate value that is a same as the at least one value that would have been produced by applying the column function to the UNION ALL of the input tables.

42. The article of manufacture of claim 41, wherein the column function comprises an AVERAGE function on one column, and wherein performing the column function on each of the input tables comprises:
determining a sum of all the values in the column in each of the input tables to produce two intermediate sum values for the two input tables;
determining a number of rows in each of the input tables to produce two intermediate count values; and
dividing a total of the two intermediate sum values by a total of the two intermediate count numbers to produce the AVERAGE on the column of the UNION ALL of the two input tables.

43. An article of manufacture including code for processing a query including a query operation on a table derived from a set operation on two input tables by:
performing the query operation on each input table separately to produce two intermediate result tables, wherein the query operation comprises a column function and the set operation comprises a UNION ALL, wherein performing the query operation comprises:
(i) performing the column function on each of the input tables separately to produce at least one value for each input table subject to the set operation, wherein the column function comprises a STANDARD DEVIATION function on one column, and wherein performing the column function on each of the input tables comprises:
(a) determining a sum of all the values in the column in each of the input tables to produce two intermediate sum values for the two input tables;
(b) determining a number of rows in each of the input tables to produce two count values;
(c) determining a sum of all the values squared in the column in each of the input tables to produce two intermediate sum of squared values for the two intermediate result tables;
(d) setting a total of the two count values to n;
(e) setting a total of the two intermediate sum values to $\Sigma x$; and
(f) setting a total of the two intermediate sums of the squared values to $\Sigma x^2$; calculating the standard deviation on the column of the UNION ALL of the two input tables as:

$$\sqrt{\frac{n*\Sigma x^2 - (\Sigma x)^2}{n^2}};$$

and
(ii) aggregating the at least one value for each of the input tables to produce at least one aggregate value that is a same as the at least one value that would have been produced by applying the column function to the UNION ALL of the input tables; and applying the set operator on the two intermediate result tables to produce a final result table that is a same result table that would have been produced by performing the query operation on a result table derived from the set operation performed on the two input tables.

44. The article of manufacture of claim 36, wherein at least one of the query operations comprises a JOIN of a table to the table derived from the set operation on the two input tables, and wherein the JOIN of the table is applied to each of the input tables separately to produce the two intermediate result tables.

45. The article of manufacture of claim 36, wherein at least one of the query operations comprises a JOIN of a table to the table derived from the set operation on the two input tables, wherein two subselect queries are provided to generate the two intermediate result tables to which the set operation is applied, further compromising:

distributing the JOIN of the table to each of the subselect queries to generate intermediate subselect queries, wherein the distributed JOIN is performed on each subselect to generate the intermediate result tables to which the set operation is applied.

46. The article of manufacture of claim 45, wherein the set operation comprises one of a UNION, INTERSECT, and EXCEPT, wherein an intermediate final result table comprises the tables derived from the set operation on the intermediate result tables, further comprising:

determining duplicate rows in the intermediate final result table; and removing the duplicate rows from the intermediate final result table to generate the final result table.

47. An article of manufacture including code for processing a query including a query operation on a table derived from a set operation on two input tables by:

performing the query operation on each input table separately to produce two intermediate result tables, wherein each input table results from a subselect query on at least one base table, wherein performing the query operation on each input table to produce the two intermediate result tables comprises:
  (i) merging the query operation with each subselect query;
  (ii) performing each merged query operation on the at least one base table subject to the subselect to produce the two intermediate result tables, wherein indexes are available for the base tables subject to the subselect queries, and wherein the indexes are used when performing each merged query operation on the at least one base table; and applying the set operator on the two intermediate result tables to produce a final result table that is a same result table that would have been produced by performing the query operation on a result table derived from the set operation performed on the two input tables;

wherein the query operation comprises a JOIN of a table to the table derived from the set operation on the two input tables, wherein two subselect queries are provided to generate the two intermediate result tables to which the set operation is applied, further comprising:
  (i) distributing the JOIN of the table to each of the subselect queries to generate intermediate subselect queries, wherein the distributed JOIN is performed on each subselect to generate the intermediate result tables to which the set operation is applied, wherein distributing the join of the table comprises:
    (a) generating an extended join table including one column having row identifiers for each row in the table to join, wherein the extended join table is applied in the JOIN operation to each of the intermediate result tables separately, wherein the determined duplicate rows have the same value for the row identifier column and the same values for the columns from the result tables included in the intermediate final result; and wherein the set operation comprises one of a UNION, INTERSECT, and EXCEPT, wherein an intermediate final result table comprises the tables derived from the set operation on the intermediate result tables, further comprising:
  (i) determining duplicate rows in the intermediate final result table; and
  (ii) removing the duplicate rows from the intermediate final result table to generate the final result table.

48. The article of manufacture of claim 46, wherein the duplicate rows are removed before the final result table is materialized in a storage device.

49. A method for processing a query including query operations and a set operation on two input tables, comprising:

applying two or more distribution rules at one time to transform the query, wherein the distribution rules correspond to the query operations;

performing the query operations on each input table separately to produce two intermediate result tables, wherein the query operations exploit available indexes;

applying the set operator on the two intermediate result tables to produce a first result table;

when one of the query operations is an aggregation operation, applying the aggregation operation to the first result table to produce a second result table that is a same result table that would have been produced by performing the query operations on a result table derived from the set operation performed on the two input tables; and when none of the query operations includes an ALL suffix, removing duplicate rows from the first result table to produce a third result table that is a same result table that would have been produced by performing the query operations on a result table derived from the set operation performed on the two input tables.

* * * * *